Nov. 18, 1969     A. M. LINDQUIST     3,478,934

METERING APPARATUS

Filed Dec. 13, 1967

United States Patent Office 3,478,934
Patented Nov. 18, 1969

3,478,934
METERING APPARATUS
Arne M. Lindquist, Alvsjo, Sweden, assignor to Aktiebolaget Helios Kemisk-Tekniska Fabriker, Stockholm, Sweden, a corporation of Sweden
Filed Dec. 13, 1967, Ser. No. 690,133
Claims priority, application Sweden, Dec. 15, 1966, 17,212/66
Int. Cl. G01f *11/34;* B67d *5/40*
U.S. Cl. 222—309
5 Claims

ABSTRACT OF THE DISCLOSURE

A liquid dispensing apparatus for discharging a metered amount of liquid. The apparatus includes a container with a metering pump. The stroke of the pump can be controlled to vary the amount of liquid dispensed. At its lower end the container includes a valve that permits the apparatus to be drip-free when it is at rest.

---

The present invention relates to a metering apparatus and more particularly to an apparatus for metering liquids, such as liquid soaps, disinfectant solutions, etc.

The type of soap dispensing apparatus most commonly used are those which dispense liquid soap when the valve controlling the flow of liquid is held depressed. Thus, these apparatus do not dispense specific, balanced portions of soap. Furthermore, a common disadvantage associated with such apparatus is that they are not drip-free. It is true that such soap dispensing apparatus are provided with specially designed valves for preventing the apparatus from dripping after it has been used, but these have not proved effective.

The advantages to be gained with the apparatus according to the invention are that an arrangement is provided which dispenses liquid in specific portions whereby it is also posible to vary the magnitude of the dispensed portion by simple means and that a drip-free apparatus is provided, and that at low cost, since the apparatus is inexpensive to manufacture. Further, the apparatus is so designed that it can be used according to a refill system, which means that when the container is empty it can be simply replaced by a new, full container. The empty container can then be returned to the company which produces the soap solution, disinfection solution etc., to be refilled. Naturally, it is also possible to fill the container with the appropriate solution in loose weight, while the container is mounted in position.

The present invention is related more specifically to a metering apparatus which includes an exchangeable liquid-container, which presents two opposed openings, situated at the top and the bottom of the container, a metering plunger pump which extends through the upper opening in the container towards the lower opening and the outlet of which is situated in the bottom end, a downwardly directed nozzle which is secured to the bottom opening of the container and sealingly connected to the outlet of the plunger pump, and a valve member including a head and a body situated in the nozzle and adapted under the action of a spring to prevent liquid from passing out through the nozzle opening when the pump is at rest. The upper portion of the nozzle is suitably provided with a tubular axial insert member, in the upper end of which the lower open end of the pump is fitted; the valve member being situated in the lower portion of the nozzle and closes the bottom end of the insert member.

Figure 1:
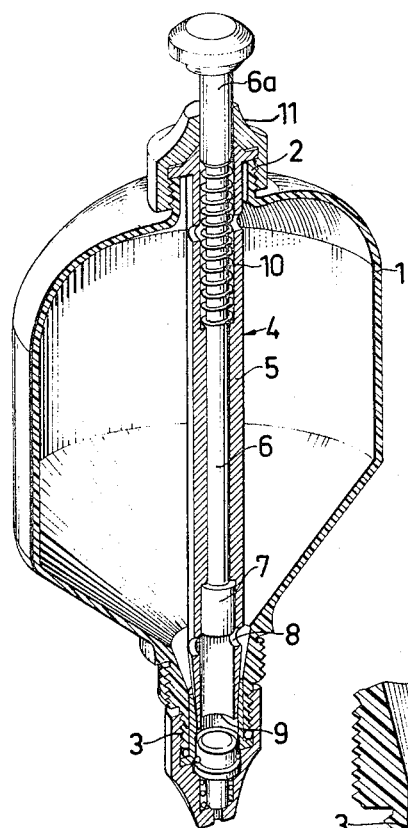
Figure 2:
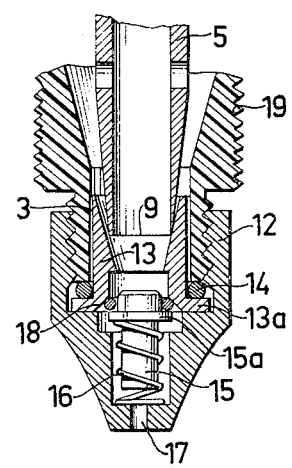

The invention will now be described with reference to the accompanying drawings, where FIG. 1 is a cut-away view in perspective of the metering apparatus according to the invention and FIG. 2 is a cut-away view in more detail of the nozzle of the metering apparatus and adjacent members.

The metering apparatus in FIG. 1 comprises an exchangeable liquid container 1 which presents two opposing openings 2 and 3, situated in the top and bottom of the container, respectively; the openings being in the form of externally threaded branch pipes. A plunger pump 4 extends through the upper opening 2 and mainly comprises a pump tube 5 and a pump stem 6 having a pump plunger 7. The bottom portion of the pump tube 5 is provided with apertures 8 through which liquid may be introduced into the pump from the container, and an end opening 9 through which liquid can be advanced to the nozzle. The pump stem 6 is acted upon by a spring 10 which abuts a shoulder within the pump tube 5 and an upper portion 6a on the pump stem 6. The coil spring 10 constantly attempts to hold the plunger stem 6 and the plunger 7 in thier uppermost position, rest position.

The piston pump 4 is secured at the top at the opening 2 by means of a perforated internally threaded head member 11, seated on the upper flange-like end of the pump tube 5 and through the holes of which the upper portion 6 of the pump stem passes.

The design of the bottom portion of the metering apparatus is best illustrated in FIG. 2.

An internally threaded, downwardly directed nozzle 12 is secured in the bottom opening 3 of the liquid container. The nozzle includes an upper enlarged portion and a reduced intermediate portion connecting the enlarged portion to nozzle opening 17. The nozzle 12 houses in its upper enlarged portion a tubular insert member 13 the lower end of which is in the form of a flange 13a. The inner wall of the insert member 13 forms an upper section flaring coincally upwards to sealingly abut the end of the tube 5, the outer wall of which tapers conically at its bottom portion. The lower section of the insert member 13 forms an enlarged chamber. Mounted on the flange 13a on the exterior of the lower section is an annular rubber seal 14, intended to seal between the container and the nozzle.

Arranged in the bottom portion of the nozzle 12 is a valve member 15 including a head and a body which is provided at the top which a radially directed flange 15a and which tapers conically below said flange. The valve member 15 is held in rest position pressed against the bottom end of the insert member 13 by means of a coil spring 16 which with its free end abuts radially directed flange 15a and with the other end against the inner wall of the nozzle around the nozzle opening 17. A rubber ring 18 is mounted on the flange 15a to provide a good seal between the valve member 15 and the insert member 13. The valve member above the flange 15a may also be provided with a circular groove in which the rubber ring 18 may rest.

Further, above the threaded lower opening 3 the container is aso provided with additional threads 19 of a greater diameter. These threads are intended to facilitate installation of the container into securing means mounted on a wall or the like.

When it is desired to use the dispensing apparatus the pump stem 6 is depressed and thereby also the pump plunger 7. The plunger urges the liquid present below the pump tube 5 downwards towards the valve member 15, which is in turn urged downwards from its seating by the liquid and gives the liquid free passage out through the nozzle opening 18. Upon completion of the downward stroke of the pump the valve member 15 is urged back by spring 16 to its rest position and cuts off the flow of liquid. In this way a sub-pressure is obtained in the nozzle, which results in that liquid present around the nozzle opening is sucked back into the nozzle, preventing said nozzle from dripping.

It is also possible to vary the metered amounts of liquid, dispensed by the apparatus, in that the upper portion of the pump stem can be changed and replaced by stems of different lengths, thus permitting the stroke of the pump to be changed according to requirements. The same result is obtained by changing the height of the head.

The various details of the metering apparatus can be made of any material suited for the purpose, although it is preferred that all details, with the exception of the seal rings and springs, are made of such thermoplastic material as nylon, polyvinyl chloride, polyethylene, and polypropene. The seal rings are suitably of natural or synthetic rubber and the springs of stainless steel wire.

I claim:

1. A metering apparatus for liquids including a liquid container having upper and lower ends and having an upper opening at its upper end and lower opening at its lower end; a metering plunger pump extending from said upper opening toward said lower opening, said pump having an outlet disposed at said lower end of said container; a downwardly directed nozzle having an upper portion secured to said container at said lower end, said nozzle having a centrally disposed opening; an annular axial insert member disposed in said upper portion of said nozzle, said insert member having an upper section which flares conically upward to receive said lower end of said pump, and a lower section defining an enlarged chamber connecting said upper section and said opening in said nozzle; a valve member including a body disposed in said nozzle and a head disposed in said lower section of said insert in spaced axial relation to said upper section, and means normally urging said valve member upwardly to its closed position to prevent liquid from passing through said nozzle opening.

2. A device as defined in claim 1, wherein said valve member includes a radially directed flange in supporting relation to an upwardly facing seal ring, said seal being adapted to sealingly abut the lower section of said insert member to close said nozzle.

3. A device as defined in claim 2 wherein said centrally disposed opening in said nozzle includes an enlarged portion in communication with said lower section of said insert member adapted to receive said valve head and a reduced intermediate portion adapted to receive said valve body interconnecting said enlarged portion to said nozzle opening.

4. A device as defined in claim 3 wherein said means normally urging said valve member upwardly comprises a spring having one end engaging the bottom of said flange and its other end engaging the inner wall of said intermediate portion of said nozzle around said nozzle opening.

5. A device as defined in claim 4 wherein said plunger pump comprises a hollow elongated tube and an elongated stem with a plunger at one end adapted to be selectively and axially displaced relative to said tube whereby said container is discharged.

References Cited
UNITED STATES PATENTS

| | | | |
|---|---|---|---|
| 185,002 | 12/1876 | Weber et al. | 222—380 X |
| 839,131 | 12/1906 | Gould | 222—309 |
| 1,325,567 | 12/1919 | Lee | 222—340 |
| 1,865,990 | 7/1932 | Wilcox | 222—385 X |
| 3,194,446 | 7/1965 | Miller | 222—385 X |

ROBERT B. REEVES, Primary Examiner

N. L. STACK, JR., Assistant Examiner

U.S. Cl. X.R.

222—340, 380, 385